United States Patent [19]

Lederman

[11] 4,314,578

[45] Feb. 9, 1982

[54] FLUID SIGNAL TRANSMITTING APPARATUS

[75] Inventor: Warren A. Lederman, Bayside, Wis.

[73] Assignee: Johnson Controls, Inc., Milwaukee, Wis.

[21] Appl. No.: 87,580

[22] Filed: Oct. 22, 1979

[51] Int. Cl.$^3$ .............................................. G05D 16/00

[52] U.S. Cl. .............................................. 137/84; 137/85

[58] Field of Search ........................ 137/84, 85, 86, 82; 92/103 M

[56] References Cited

U.S. PATENT DOCUMENTS

| | | | |
|---|---|---|---|
| 2,669,247 | 2/1954 | Olah | 137/84 |
| 2,851,048 | 9/1958 | Huchinson | 137/86 |
| 2,961,165 | 11/1960 | Whitenack | 32/103 M X |
| 3,020,490 | 2/1962 | Kleiss | 137/86 X |
| 3,470,895 | 10/1969 | Joy | 137/85 |
| 3,799,498 | 3/1974 | Wickham | 137/84 X |
| 4,207,914 | 6/1980 | Holloway | 137/85 |

*Primary Examiner*—Alan Cohan

*Attorney, Agent, or Firm*—Andrus, Sceales, Starke & Sawall

[57] ABSTRACT

A fluid signal inverting unit includes a motion balance unit having a lever which operates a valve. The balance lever is supported at the opposite ends by a pilot signal chamber and a feedback signal chamber and an intermediate pivot support is coupled to position a back pressure leakport valve. Each chamber includes an outer matched linear metal diaphragm fixedly connected to the aligned end of the lever. Increases in pilot pressure result in the outward movement of the linear diaphragm and corresponding outward and pivotal movement of the lever. The lever tends to move away from and open the valve resulting in a decrease in the output pressure and an inverted output pressure signal which may be further amplified and transmitted to a flow booster relay, and as negative feedback signal to the feedback chamber. Decrease in pilot pressure results in an opposite action and an increase output pressure.

4 Claims, 4 Drawing Figures

FLUID SIGNAL TRANSMITTING APPARATUS

BACKGROUND OF THE INVENTION

This invention relates to a fluid signal transmitting apparatus and particularly for transmission of a pilot or control fluid signal for controlling an output fluid signal.

Fluid control and operating systems are employed in various applications. In many systems, a relatively low level lever fluid signal constitutes an input signal to a fluid control system. The relatively low level signal is coupled through a suitable amplifier and/or relay means to generate an appropriate output pressure signal for operating a suitable load device, which may require a relatively high flow capacity. In a direct acting system, the output signal directly increases and decreases with the control signal level. A direct or reverse acting function between the output signal and the pilot or control signal may be developed. A reverse acting system is used in order to maintain compatability with the actuator or load characteristic. In a reverse acting system, the output signal decreases as the pilot or control signal increases and conversely increases as the pilot signal decreases. Various fluid amplifying devices and signaling systems may be incorporated into either system for amplifying of the control signal and/or the output pressure signal. For example, a typical method of inverting the pilot signal uses a reversing relay unit in which a plurality of stacked diaphragms define interrelated input and output chambers. The pilot or control signal and the output signal are applied to opposing chambers and a force balance condition on the several stacked diaphragms results in control of the output signal. In a particularly practical system, three diaphragms are mounted in stacked relationship with the pilot pressure applied between the middle and upper diaphragms. The output pressure is derived from the bottom chamber. A modulating output valve in the bottom chamber is coupled to the adjacent diaphragm unit and positioned in response to the relative balance of the pilot and output pressures to vary the output pressure in a predetermined manner with respect to the pilot pressure. The upper chamber constitutes a reference chamber, which may be provided with a spring or other preload means for adjusting the output set point of the relay. Although stacked diaphragm-type relays are widely used, such devices have certain known limitations, particularly with regard to accuracy. Thus, the output signal amplification is directly related to the ratio of the respective diaphragm areas. Even a small difference in the effective areas of the diaphragms may often create significant inaccuracy in the output ratio. Further, the effective area may change with pressure level and as a result the linearity of the device is adversely affected. Many such relays also have significant hysteresis which prevents precise response during increasing and decreasing signal levels. A particularly satisfactory booster relay which eliminates some of the problems of hysteresis is shown in copending patent application of Thomas M. Holloway et al, Ser. No. 964,068 filed Nov. 27, 1978. As more fully disclosed therein, hysteresis can be significantly reduced by providing spaced exhaust and supply valve units in the output chamber which seat independently in response to movement of a diaphragm, and with the diaphragm moving into sealing engagement with the exhaust valve port.

There is therefore a demand in the art of fluid signal relays or transmitting apparatus which provides highly accurate tracking and a linear output response with minimal or essentially no hysterisis, while maintaining a rugged, inexpensive and readily commercially produced construction.

SUMMARY OF THE INVENTION

The present invention is particularly directed to a fluid signal transmitting apparatus which develops an output signal which is linearly proportional to a pilot or control fluid signal and, in a particular embodiment provides an output fluid signal which is inversely proportional to a pilot pressure signal while maintaining a high degree of accuracy and minimal hysterisis effect. Generally in accordance with the present invention, a motion balance means is provided for controlling of an output signal transmitting valve means in combination with a pilot signal motion generating means coupled to move the motion balance means in one direction and a matched feedback signal motion generating means coupled to oppose or balance such motion and promote movement of the balance means in an opposite direction. Pilot or control signal pressure is applied to the signal motion generating means which tends to promote movement of the motion balance unit in a first direction with a related actuation of the output signal valve. The output valve movement produces an inverted output signal which is suitably processed to provide a signal to the load and is also coupled as a negative feedback signal to the feedback motion generating means. The negative feedback signal promotes an accurate stable performance with a highly effective and stable equilibrium established for any particular pilot signal. In a particularly practical embodiment of the invention, the output pressure is applied to a fluid amplifying device such as a diaphragm amplifier. The output of the diaphragm amplifier is transmitted to a booster relay such as that disclosed in the previously identified copending application to establish appropriate flow capacity for operating of a high flow load.

In accordance with a particularly unique and practical feature and embodiment of the present invention, the motion balance means includes a flexure lever unit which includes an intermediate pivot means connected to position a leakport valve unit. The pilot and the feedback signal generating units each includes a fluid chamber having an outer movable wall which is preferably a linear metal diaphragm. The diaphragms of the two chambers are selected to have identical characteristics. The pilot diaphragm of the pilot chamber is coupled to the flexure lever to the one side of the pivot means. The feedback diaphragm of the feedback chamber is similarly coupled to the flexure lever to the other or opposite side of the pivot means. Changes in the pilot pressure signal results in the movement of the linear diaphragm and corresponding movement of the end of the lever. With increased pressure, the flexure lever tends to move away from the valve unit, and opens the leakport valve unit resulting in a decrease in the output pressure, thereby generating the reverse action. The output pressure signal may then be further amplified and transmitted to the load and simultaneously to the feedback chamber.

The degree of linearity obtained is of course directly related to the linearity of the motion generating diaphragms as well as the diaphragm amplifier and signal booster relay. Such components are readily available with high degrees of linearity, and the signal transmitting apparatus may produce an output which is linearly proportional to the pilot signal with essentially no hysterisis.

The present invention thus provides a fluid signal relay or transmitter which can provide linear, accurate and proportional signals while employing relatively available and well known components.

DESCRIPTION OF ILLUSTRATED DRAWINGS

The drawings furnished herewith illustrate a preferred construction of the present invention in which the above advantages and features are clearly disclosed as well as others which will be readily understood from the following description.

DESCRIPTION OF ILLUSTRATED EMBODIMENT

Figure 1:
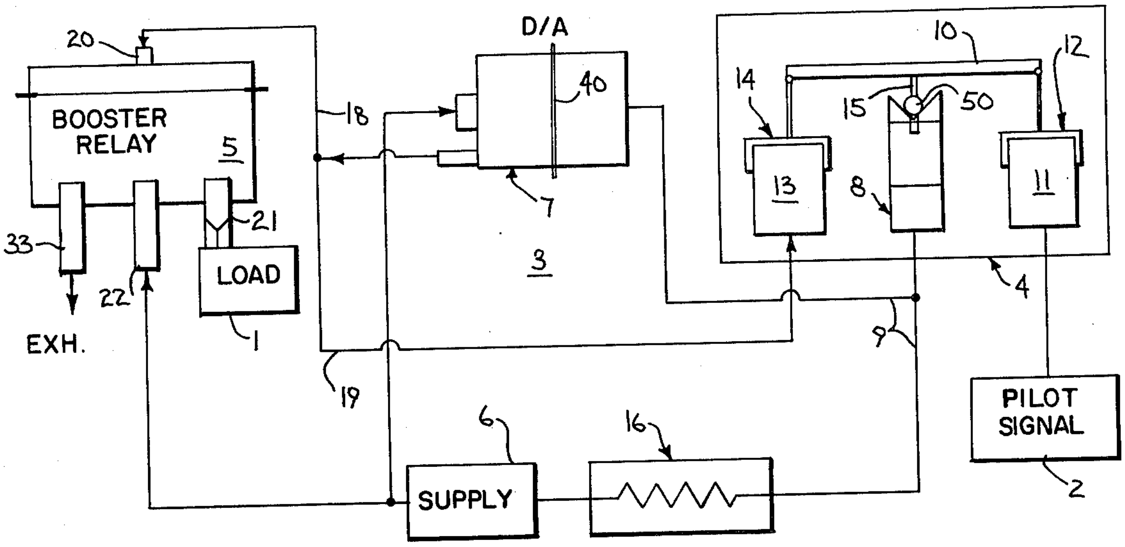
FIG. 1 is a diagrammatic illustration of a fluid control system incorporating a motion balance signal transmitting apparatus constructed in accordance with the present invention.

Referring to the drawings and particularly to FIG. 1, a pneumatic control system is illustrated for operating a fluid actuator 1 or other similar load. The load 1, for example, may be a pneumatic actuator for positioning a valve, damper or other control unit in an environmental air conditioning system or other operating system. The pneumatic actuator 1 is positioned by selective supply of pressurized air thereto. The actuator positioning may be in response to a suitable fluid control or pilot signal generated by any pilot signal source 2 which is coupled to control the supply of air to load 1 by a suitable signal processing circuit 3. In the illustrated embodiment, the load signal is to be inversely proportional to the pilot signal and the processing circuit 3 includes a signal transmitter 4 which is constructed to transmit a signal which is the inverse of the pilot signal. A booster relay 5 is signaled by said inverted signal and couples the load 1 to the air source 6 for providing an output signal to the load 1 of proper pressure and flow for operation thereof. A diaphragm amplifier 7 is shown interposed between the output of the signal transmitter 4 and the input to the booster relay 5 to increase the level of the inverted pilot signal for appropriate operation of the booster relay 5. The booster relay 5 provides a direct one to one conversion of the amplified and inverted pilot signal and isolates the pilot signal from the load signal flow.

The signal inverting transmitter 4 is diagrammatically illustrated in FIG. 1 including a leakport unit 8 connected to an input-output inverted signal line 9 for transmitting of a back pressure inverted signal to the input of the diaphragm amplifier 7. The opening and closing of back pressure leakport unit 8 is controlled by a balance lever or flexure member 10. The flexure member 10 extends to the opposite sides of the leakport unit and is mounted to pivot about the leakport unit. A pilot signal chamber 11 includes a movable wall 12 coupled to the balance lever member 10 to the one side of the leakport unit 8. A similar feedback signal chamber 13 includes a movable wall 14 which is coupled to the balance member 10 to the opposite side of the leakport unit 8. The flexure or balance member 10 includes a leakport operator 15 which is operatively coupled with a pivotal engagement to the leakport unit 8 and which is operative to open and close the leakport unit 8 in accordance with the movement of the balance member 10.

The leakport unit 8 in the embodiment of the invention is connected as a downstream end of a back pressure sensing system. The upstream end of the back pressure signal line 9 is connected in series with a resistor 16 to an air supply or source 6, with a common connection of the line 9 to the unit 8 and to amplifier 7.

The output of the diaphragm amplifier 7 is coupled via lines 18 and 19 to the booster relay 5 and to the feedback chamber 13. The booster relay 5 is illustrated as a three-port unit having an input signal port 20 connected to diaphragm amplifier 7, an output port 21 connected to the load 1 and a supply port 22 connected to source 6.

The operation of the illustrated embodiment of the invention as shown in FIG. 1 is briefly summarized as follows. The pilot pressure signal 2 is applied to the chamber 11 and the movable wall 12 moves to correspondingly move the lever member 10 about and with the operator 15 of the leakport unit 8. The lever member also pivots about the valve ball and the opposite end of the lever member 10 moves in an opposite direction. The latter end of member 10 and its movement is coupled to the chamber 13 and tends to reduce the volume of chamber 13 against the pressure signal established at the feedback signal line 19. As a result of such outward and pivotal motion of lever 10, the valve unit 8 opens, thereby increasing the exhaust of air supplied through fluid restrictor or resistor 16 and reducing the output signal at line 9. Tnis is an inverting sense of the pilot signal. If the balance point of operator 15 is located at the exact center of the lever member 10, a one to one ratio in the inverted signal results. The inverted signal is suitably amplified by diaphragm amplifier 7 to an appropriate signalling level and simultaneously fed back to the feedback chamber 13 and to the booster relay 5. The signal being inverted constitutes a negative feedback signal thereby stabilizing the operation of the transmitter 4. The signal to the booster relay 5 is a proportionate signal and the output of the booster relay 5 correspondingly actuates and positions the load 1.

A reduction in the pilot signal from source 2 reverses the sequence. Thus, the lever or flexure member 10 pivots in the opposite direction and moves toward the chamber to re-establish the balanced state. The leakport unit 8 correspondingly closes, thereby increasing the back pressure signal and establishing the proportionate inverted signal change to load 1.

Figure 2:
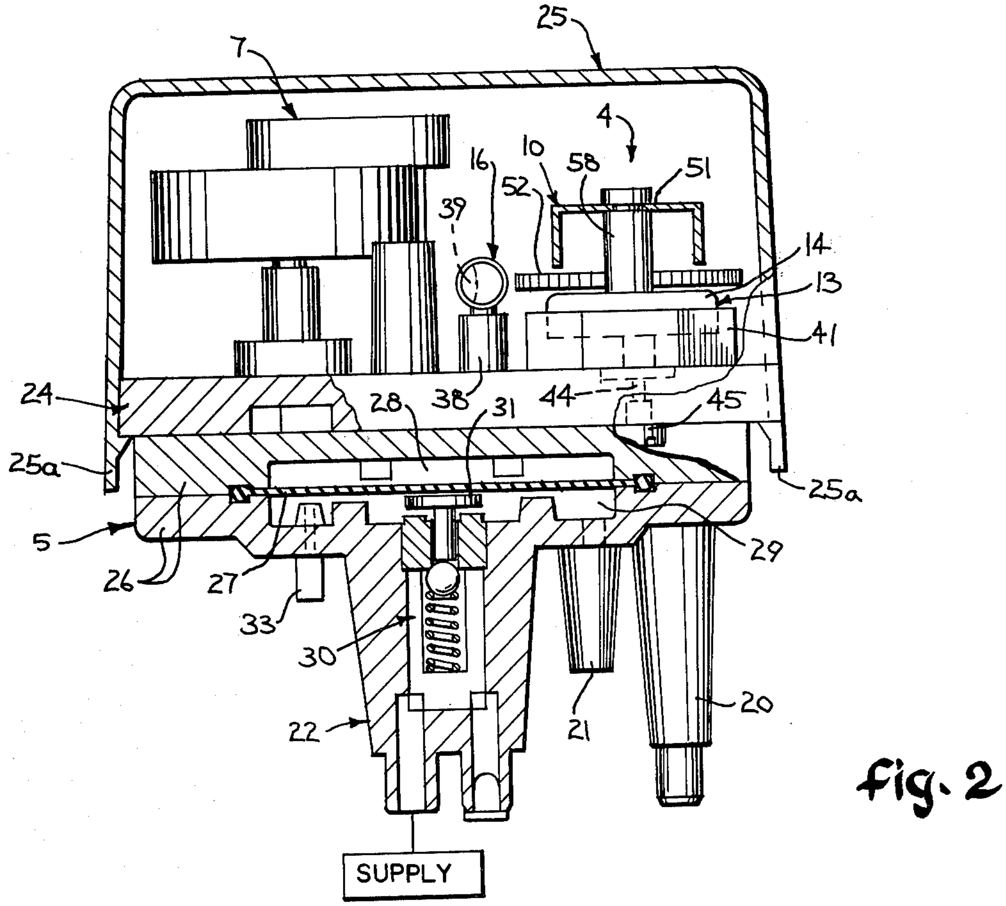
FIG. 2 is a side elevational view of a signal amplifying and reversing relay unit incorporating a motion balance signal transmitter constructed in accordance with the teaching of the present invention, with parts broken away and sectioned to show certain details of constructions.
Figure 3:
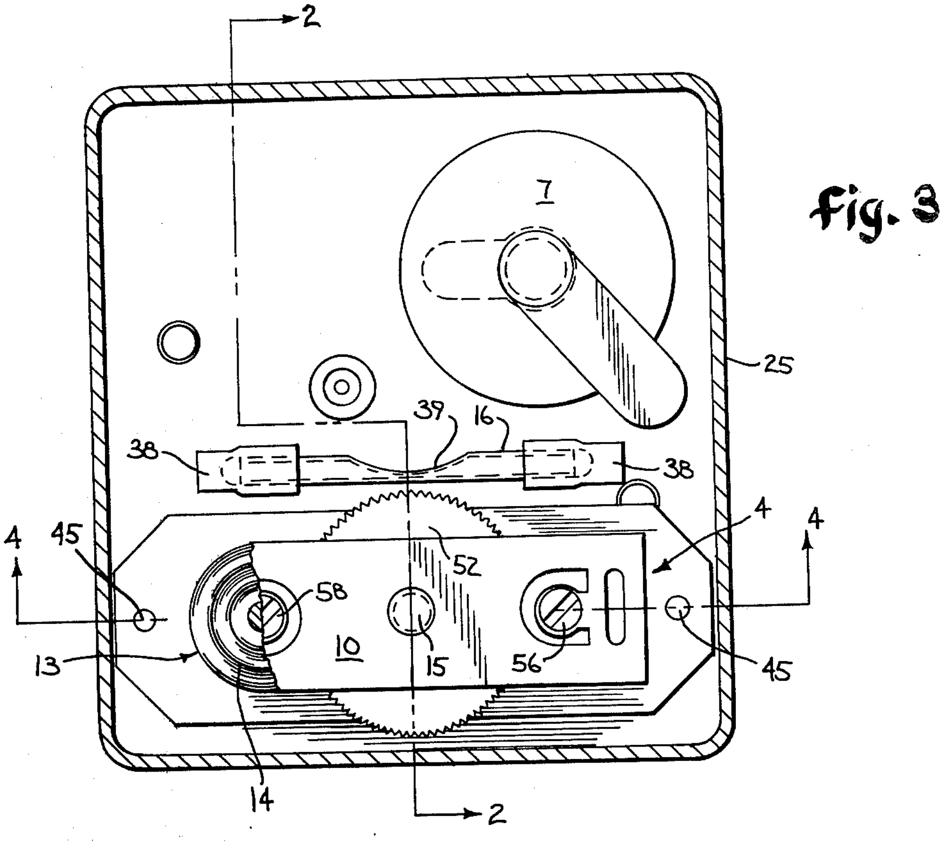
FIG. 3 is a plan view of the unit shown in FIG. 2 with parts broken away and sectioned to show detail of construction.
Figure 4:
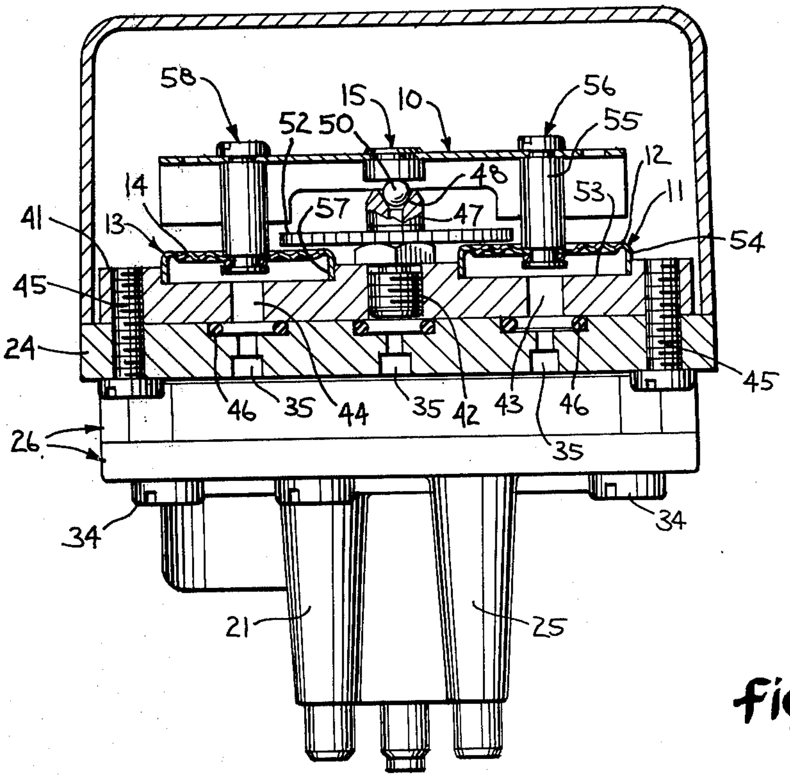
FIG. 4 is an enlarged vertical section taken generally on line 4—4 of FIG. 3.

The present invention is particularly directed to the transmitter 4 and a preferred construction is illustrated in FIGS. 2–4 as an integrated part of a system module incorporating the several components of FIG. 1 and more fully developed hereinafter. The description of the more or less standard components is briefly described as required to clearly set forth a preferred construction and as necessary to provide a complete and clear description of the illustrated transmitter 4 and its system connection.

In the preferred illustrated embodiment of the invention, the several interrelated components are integrated into a single structure with the booster relay as the basic supporting structure to provide a compact unit, such as shown in FIGS. 2–4.

Generally, in the system module, the booster relay 5 is constructed as in the previously identified copending application and forms a supporting or base structure. A component coupling and mounting unit in the form of a plate 24 is secured to the booster relay 5 and supports the several system components, such as transmitter 4, amplifier 7 and resistor 16. Base plate 24 and the adjacent booster relay housing are also preferably formed with appropriate openings and passageways to form the interconnecting connections shown in FIG. 1. A cover 25 is shown releasably secured to base plate 24 to enclose the system components. The outer cover 25 may be provided with a snap connection to the mounting plate 24. The sidewalls of the cover are shown with depending tabs **25*a* having inner inclined coupling projections. The cover can be forced downwardly over the base plate 24** with the tabs bending outwardly and then snapping into engagement with the underside of the mounting base to firmly mount the cover in position. The several components may be conveniently formed of a suitable molded plastic with the necessary passageway, recesses and opening molded therein.

More particularly, relay 5 includes a two-part housing consisting of a pair of plate like members 26 secured in stacked relation. The opposed surfaces are recessed and a diaphragm 27 is clamped between the housing members to define a pilot or signal input chamber 28 and a main output chamber 29 to opposite sides of the diaphragm. The output chamber 29 includes a spring-loaded supply valve 30 which is biased to a closed position by spring loading and by supply pressure. A T-shaped operator or actuator 31 is located in the valved orifice, with the operator promoting selective opening of supply valve 30. The actuator 31 is guided in the valved opening and engaged by the diaphragm as it moves into the output chamber 29. In both constructions, slight movement of the diaphragm controls opening of the valved orifice for supplying of a signal from the source 6 through the output chamber to the output port 21 for transmission to the load 1. In addition, an exhaust port 33 is provided with a flat control face in opposed relation to the diaphragm 27 such that movement of the diaphragm 27 simultaneously controls the opening and closing of the exhaust port 33 to further modulate the transmitted load pressure and flow transmitted to the load 1. The input chamber 28 is coupled to the diaphragm amplifier 7 via signal port 20 for selectively biasing diaphragm 27 into the output chamber 28 for selective opening and closing the valved opening and the exhaust port 33. Thus, the output pressure builds in the output chamber 29 to balance the signal pressure in chamber 28, with the pressure signal transmitted through the output port 21 to the load 1, and in part exhausted to maintain a balanced position depending upon pressure changes and the position of the diaphragm. As more fully developed in the above entitled application, this structure produces a load pressure signal to a large flow consuming load 1 with minimum hysteresis.

Generally, the support or base plate 24 supports the diaphragm amplifier 7, the resistor 16, and the transmitter, and is attached to the top housing member 26 of the booster relay housing. Suitable clamping bolts 34 are shown in FIG. 4 passing through the relay housing 26 into appropriately threaded openings in the plate 24.

In the illustrated embodiment, as most clearly shown in FIG. 3, the transmitter 4 is shown extending across one side of the base plate. The diaphragm amplifier 7 is mounted on the opposite side of the base plate 24. The resistor 16 is secured between the transmitter 4 and diaphragm amplifier 7. The diaphragm amplifier 7, the resistor 16 and other similar components can be of any suitable construction and detailed description is given thereof only as necessary to a clear and full understanding of this invention as shown. Suitable internal passageways as generally shown by number 35 are formed by suitable recesses and connecting openings in the base plate 24 and closed by the recessed signal housing member of relay 5 to define the several interconnecting fluid system lines shown in FIG. 1. As such detail will be readily provided by those skilled in the art, the particular recesses and lines are not shown in detail in FIGS. 2–4.

The resistor 16 may be a standard tubular member mounted at the opposite ends in suitable integral connector or mounts 38 having vertical passageways coupled to the opposite ends of the tubular resistor. The resistor 16 is crimped as at 39 to define a fixed orifice, thereby establishing a fixed pressure drop and thereby resistance to flow.

The diaphragm amplifier 7 may be of any conventional construction including a suitable two-piece molded construction with a diaphragm 40 defining the common wall between an output chamber and an input chamber, as schematically shown in FIG. 1. The output chamber may be integrally formed in the base plate 24 and coupled to the supply by suitable internal passageways. The signal housing portion may be molded and secured to the base plate to clamp diaphragm 40 in place. The diaphragm controls an orifice opening, not shown, to create a corresponding related amplified output signal to the coupling output lines 18–19 formed within plate 24.

Referring to FIGS. 3 and 4, the transmitter 4 is integrally formed with base wall 41 having three laterally spaced openings 42, 43, and 44 and defining the three fluid connections to thereto. The appropriate base plate recesses and openings 35 are aligned with openings 42–44 which are connected respectively with the leakport unit 8, the signal chamber 11, and the feedback chamber 13 of transmitter 4. Base wall 41 is physically attached to the top of the mounting or base plate 24 as by separate bolts 45 to clamp the several openings 42–44 in alignment with passageway recesses formed in the top of plate 24 and to compress suitable O-ring seals 46. The O-ring 46 are located about the interconnecting passageway recesses for each of the units at the interface of the base wall 41 and the mounting plate 24 to provide fluid tight connection for the passageways to the several units 8, 11 and 13.

The leak port unit 8 is shown as a known ball-type construction having a tubular housing 47 which is threaded into opening 42 of base 41. The outer end of the housing 47 is a more or less flat surface, with an internal opening or passageway having a valve seat 48. Air pressure urges a check ball 50 outwardly to open the leakport orifice to a full open position. The valve unit 8 is selectively closed by positioning operator 15 to force check ball 50 toward the valve seat 48.

The flexure lever 10 which is coupled to the leakport unit 8 by the operator 15 is shown as a generally channel-shaped arm. The illustrated operator 15 is a button-type spacer 15 which is suitable secured to the center of arm 10 as by a riveted or staked connection in alignment with the check ball 50. The initial position of the check ball 50 and the corresponding closing of the unit 8 is adjustable. This adjustment therefore sets the set point output pressure as required for proper system operation. In the illustrated embodiment, the orifice unit housing 47 is provided with thumbwheel 52 for manual turning and coaxial positioning the unit 8 relative to the spacer 15. Other setpoint adjustment means might of course be provided.

The lever 10 is supported in predetermined spaced relationship to the leakport unit 8 by the connection of the opposite ends of lever 10 to the signal chamber 11 and the feedback chamber 13, as follows.

The signal chamber 11 is formed by a round recess 53 in the outer wall of the transmitter base wall 41 in alignment with an opening 43 and the signal passageway in the mounting plate 24. The movable wall 12 of chamber 11 is a cup-shaped diaphragm having a depending flange 54 which is sealed within the recess in the plate. The diaphragm unit preferably is an integral cup-shaped metal member having a plurality of circular convolutions formed in the outer wall. The diaphragm will be recognized as a known linear metal diaphragm having a linear output characteristic. Thus, the physical position of the diaphragm and particularly the central portion of the movable outer wall is linearly proportional to the pressure within the chamber 11. The motion of the diaphragm and the corresponding motion of lever 10 is linearly related to the pilot pressure. A support pin 55 is shown staked to the central portion of the diaphragm 12 and extends outwardly into abutting engagement with the underside of the base portion of the channel-shaped lever arm 10. A small coupling bolt 56 passes through an appropriate opening in the lever 10, and threads into the pin 55 to firmly and affixedly attach the corresponding aligned portion of lever 10 to the diaphragm 12. The diaphragm thus supports the corresponding end of the lever 10 with the movement of the diaphragm wall creating a corresponding movement to the outer end of the lever 10.

The feedback chamber 13 is similarly formed with an outer cup-shaped linear diaphragm 57 secured within a recess aligned with opening 44 and secured by a pin unit 58 to an opposite end portion of the lever 10 on the opposite side of the pivotal connection to the valve unit 8.

In the illustrated embodiment of the invention, the chambers 11 and 13 and the connections of the diaphragms to the lever 10 are equally spaced to the opposite sides of the center line or axis of the leakport unit 8. Thus, the lever motion results in a slight outward movement with increasing signal pressure or inward movement with decreasing signal pressure at the center position of the lever and creates a corresponding repositioning of the leakport check ball 50 and opening and closing of the valve unit 8. In operation, corresponding but opposite movement of the opposite ends of the lever 10 results in response to the pivotal movement of the lever with changes in pilot pressure. In particular, for increasing pilot signal pressure, the outer diaphragm wall 12 moves outwardly of the chamber 11 and transmits a corresponding relative outward movement of the corresponding end of the lever 10, as previously discussed with respect to FIG. 1. Assuming all other conditions are constant, the lever 10 simultaneously moves outwardly and pivots an operator 15 about the check ball 50. The opposite end of the lever 10 which is secured to diaphragm wall 14 moves in an opposite direction as a result of the pivoting and forces the diaphragm 14 to move inwardly of the feedback chamber 13. Conversely, reducing of the pilot pressure in chamber 11 results in an opposite inward movement of the signal diaphragm wall 12 with a corresponding opposite pivoting and movement of the lever 10. Thus, the lever tends to move in a "seesaw" motion similar to that of a simple pivoted balance. The motion is directly related to the pilot pressure and the motion is established until an essentially balanced condition is created. The negative feedback created by the connection of the inverted signal promotes a stable balance condition for any given signal pressure. The negative feedback system promotes accurate and stable equilibrium conditions.

The present invention thus provides a signal relay unit which establishes a linear output with minimal hysteresis affect. The absolute degree of linearity will be directly dependent upon the linearity of the several diaphragms employed. The diaphragm units of the pilot and feedback chambers, as previously noted, can be selected with a high degree of linearity and closely matched. Diaphragm amplifiers as well as the booster relay of the diaphragm type are highly developed devices and available with a high degree of linearity. For example, the relay disclosed in the previously identified copending application provides a linear output.

The invention is shown in a preferred reverse acting relay system but the various components can be significantly modified. The present invention is particularly directed to the transmitter employing a motion balance mechanism in contrast to a more conventional force balance mechanism and in particular to a motion balance system having a movable balance lever operated on by a signal chamber and a feedback chamber, each of which includes a movable wall with such movable walls coupled to oppositely move the balance member in combination with a valve means coupled to the balance member and positioned thereby.

Various modes in carrying out the invention are contemplated as being within the scope of the following claims, particularly pointing out and distinctly claiming the subject matter which is regarded as the invention.

I claim:

1. A fluid signal inverting apparatus comprising a signal chamber having a signal port and including a diaphragm forming one wall thereof, a feedback chamber having a signal port and including a diaphragm forming one wall thereof and mounted in spaced relationship to said signal chamber, said diaphragms of said signal chamber and feedback chamber being matched and located in a common plane, a motion balance lever member spanning said diaphragms, rigid interconnecting means connecting the diaphragms to said balance lever member and supporting said balance lever member for movement relative to said signal chambers, a valve means located in fixed relationship intermediate said chambers and having a valve operator, said valve operator being connected to said lever member and including a pivotal connection and responsive to the movement of the lever member associated with movement of said diaphragms to position said valve operator and valve means in accordance with the lever member movement, and including a base plate having said chambers formed by recesses in one wall of said plate and said diaphragms each being a cup-shaped diaphragm having the sidewalls sealed in said recesses, said rigid interconnecting means including pin members affixed to the center of said diaphragms and to the aligned portion of said lever members, said valve means being adjustably secured to said plate for axial positioning toward and away from said valve operator, said valve operator being a spacer member secured to the lever member and extending into operative engagement with the valve means.

2. The apparatus of claim 1 wherein said valve means is a ball-check structure having a check ball movably mounted relative to a valve seat, and having air pressure means urging said ball outwardly into abutting supporting engagement with said operator to define said pivot connection whereby said operator pivots on said ball.

3. The apparatus of claim 2 having said base plate projecting from said chambers, a diaphragm amplifier secured to said plate and having an input chamber, passageway means in said plate connected to said input chamber and to said valve means, a restrictor mounted to said plate, and passageways connecting one end of said restrictor to said valve means and the opposite end defining a supply connection means.

4. The apparatus of claim 3 including a booster relay means having a pair of signal chamber plate members with opposed recesses and a diaphragm between said plates to form a signal amplifier chamber in a first of said plates and an input-output chamber in the second of said plate, means to secure said base plate to said first of said signal chamber plate members and including passageways connecting said diaphragm amplifier to said signal amplifier chamber and to said feedback chamber, said second of said signal chamber members having said input-output chamber including a supply port and an output port connected to said input-output chamber and having a pilot port, passageways in said plate members and in said base plate connecting said pilot port to said signal chamber in said base plate.

* * * * *